No. 728,290. PATENTED MAY 19, 1903.
A. PLANT.
FLOOR TILE.
APPLICATION FILED APR. 16, 1902.
NO MODEL.
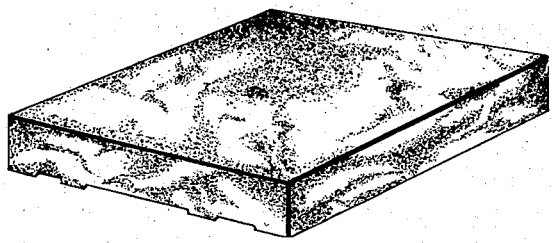
WITNESSES
Norris F. Clark.
M. H. Watkins.
INVENTOR
Alfred Plant
By [signature]
Atty.

No. 728,290. Patented May 19, 1903.

UNITED STATES PATENT OFFICE.

ALFRED PLANT, OF KEYPORT, NEW JERSEY.

FLOOR-TILE.

SPECIFICATION forming part of Letters Patent No. 728,290, dated May 19, 1903.

Application filed April 16, 1902. Serial No. 103,078. (No specimens.)

*To all whom it may concern:*

Be it known that I, ALFRED PLANT, a citizen of the United States, residing at Keyport, in the county of Monmouth and State of New Jersey, have invented certain new and useful Improvements in Floor-Tiles; and I do declare the following to be a full, clear, and exact description of the invention, such as will enable others skilled in the art to which it appertains to make and use the same, reference being had to the accompanying drawing, which forms a part of this specification.

This invention relates to floor-tiles; and its object is to produce a vitrified tile having the appearance of marble. Tiles have been made of a mixture of white and colored dusts, so as to present a speckled or "pepper-and-salt" appearance; but, so far as I am aware, there has not been made heretofore a tile having the delicate veined and clouded effect of marble. Such an effect is very desirable in floor-tiles to enable an architect to harmonize the floor with the marble-lined walls of a hallway or room. Floor-tiles of marble are too soft to be serviceable, and, moreover, marble is not a fireproof material, being readily calcined by high temperature. My improved tile being fired in a kiln is absolutely fireproof and being vitrified is hard and durable. The materials from which I make this tile may be those ordinarily used in producing articles of this kind; but I prefer to dispense with feldspar, cornwall stone, baryta, glass, fret, and quartz and use only clays combined in certain proportions. I prefer to use not less than fifty per cent. of a kaolinic mineral, such as micaceous clay, composed mainly of silicate of alumina, with sufficient alkali to produce vitrification. The other ingredients are preferably not more than twenty-five per cent. of kaolin and of potters' ball-clay and not more than twenty-five per cent. of buff, gray, or red burning clays. These substances are mixed together and passed through the slip-house and dust department in the ordinary way. No special treatment is required to prepare the dust for the die-press.

In producing the imitation marble or "lithomarbre," as I term it, great care must be exercised both at the tile-press and the die. The dust must not be heaped into the dust-box promiscuously, but laid up in layers of contrasting color. If white and bluish-gray are selected, these colors must alternate, the proportion of each being determined by the general tone to be given to the floor, whether light or dark. The color is produced either by mixing metallic oxids with white dust in the manner familiar to all tile manufacturers or by selecting vitrifiable clays of different colors and chemical compositions. Having laid up the dust in layers in the dust-box, the workman then cuts down vertically through them with his hand or with a suitable implement, so as to separate from the mass a quantity sufficient to fill the box of the die. This charge of dust he then moves toward the press and the die, taking care to preserve the layers of color intact in their original positions, when by a single swift sweep of the hand or implement he simultaneously spreads the dust and fills the box of the die. One or two skilful strokes of a striking-tool complete the effect, leaving the different colors in mingled but distinct masses and producing either a clouded or a veined appearance, as may be.

Particular pains must be taken not to intimately mix the colors, since this would result in a general tint or a spotted surface quite different from marble. The tile is then pressed and fired in the usual manner. If desired, the dies may be made to produce on the upper surface of the tile a design in cameo or relief to prevent the floor from becoming smooth and polished by wear.

The accompanying drawing represents a tile made in accordance with my invention.

Having thus described my invention, what I claim, and desire to secure by Letters Patent, is—

1. As a new article of manufacture, a non-absorbent, indestructible floor-tile representing marble throughout its entire mass, and composed of vitrifiable kaolinic mineral, kaolin, potters' ball-clay, and a staining ingredient.

2. As a new article of manufacture, a floor-tile representing marble throughout its entire mass, and composed of vitrifiable kaolinic mineral, kaolin, potters' ball-clay, and buff, gray or red burning clays.

In testimony whereof I affix my signature in presence of two witnesses.

ALFRED PLANT.

Witnesses:
GEORGE W. AUMACK,
S. F. MASON.